(12) United States Patent
Shimizu (10) Patent No.: US 7,858,866 B2
(45) Date of Patent: Dec. 28, 2010

(54) TRAINING SETTING APPARATUS AND SYSTEM, AND GROUPING METHOD THEREOF AND COMPUTER-READABLE MEDIUM CONTAINING COMPUTER PROGRAM THEREFOR

(75) Inventor: Takashi Shimizu, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 11/829,958

(22) Filed: Jul. 30, 2007

(65) Prior Publication Data
US 2008/0028916 A1 Feb. 7, 2008

(30) Foreign Application Priority Data
Aug. 1, 2006 (JP) ............... 2006-209785

(51) Int. Cl.
*G09B 15/00* (2006.01)
(52) U.S. Cl. .................................... 84/470 R
(58) Field of Classification Search ............... 84/470 R
See application file for complete search history.

(56) References Cited

U.S. PATENT DOCUMENTS

| | | | | |
|---|---|---|---|---|
| 3,470,785 A * | 10/1969 | Shallenberger et al. | ... | 84/470 R |
| 3,478,159 A * | 11/1969 | Olson | ........................ | 84/719 |
| 3,541,915 A * | 11/1970 | Rhodes | ...................... | 84/470 R |
| 3,584,530 A * | 6/1971 | Andersen | .................. | 84/470 R |
| 3,695,138 A * | 10/1972 | Andersen | .................. | 84/470 R |
| 3,782,237 A * | 1/1974 | Okamoto | .................. | 84/470 R |
| 3,784,717 A * | 1/1974 | Okamoto | .................. | 84/470 R |
| 3,817,144 A * | 6/1974 | Okamoto | .................. | 84/470 R |
| 3,969,831 A * | 7/1976 | Hanaoka et al. | ............. | 434/320 |
| 4,010,557 A * | 3/1977 | Martin et al. | ................ | 434/319 |

(Continued)

FOREIGN PATENT DOCUMENTS

JP          7199790 A          8/1995

(Continued)

OTHER PUBLICATIONS

Sanako Lab 100 User Guide, document date Jun. 27, 2005.*

(Continued)

*Primary Examiner*—Jeffrey Donels
*Assistant Examiner*—Robert W Horn
(74) *Attorney, Agent, or Firm*—Rossi, Kimms & McDowell LLP (57) ABSTRACT

An apparatus, system, method, and computer-readable medium provides control for displaying, on a display device, a classroom screen with symbolic images representative of a plurality of slave instruments connected to a master instrument in accordance with actual positional relationship between the slave instruments in the classroom, or by different locations thereof. Any one of the symbolic images displayed on the display device can be selected and moved to a desired position from the original position. A moved position of the moved symbolic image is determined. If the determined moved position is a position corresponding to another of symbolic images, the group identification, which can be stored in a storage, of the slave instrument corresponding to the moved symbolic image is changed to the group identification corresponding to the slave instrument associated with the symbolic image located at the moved position. The display is automatically changed so that the moved symbolic image returns from the moved position to the original position.

10 Claims, 4 Drawing Sheets

U.S. PATENT DOCUMENTS

| | | | | |
|---|---|---|---|---|
| 4,386,551 A * | 6/1983 | Morgando | ................. | 84/470 R |
| 4,538,995 A * | 9/1985 | Fryer | ......................... | 434/432 |
| 4,617,851 A * | 10/1986 | Sato | ............................ | 84/622 |
| 4,715,818 A * | 12/1987 | Shapiro et al. | ............... | 434/118 |
| 4,759,717 A * | 7/1988 | Larochelle et al. | .......... | 434/118 |
| 4,963,097 A * | 10/1990 | Anju | ......................... | 434/431 |
| 5,002,491 A * | 3/1991 | Abrahamson et al. | ....... | 434/322 |
| 5,176,520 A * | 1/1993 | Hamilton | .................... | 434/350 |
| 5,310,349 A * | 5/1994 | Daniels et al. | ............... | 434/350 |
| 5,318,450 A * | 6/1994 | Carver | ......................... | 434/336 |
| 5,479,599 A * | 12/1995 | Rockwell et al. | ............. | 715/837 |
| 5,563,359 A * | 10/1996 | Okamura | ..................... | 84/600 |
| 5,727,950 A * | 3/1998 | Cook et al. | .................. | 434/350 |
| 5,788,508 A * | 8/1998 | Lee et al. | .................... | 434/350 |
| 5,823,788 A * | 10/1998 | Lemelson et al. | ........... | 434/350 |
| 5,974,446 A * | 10/1999 | Sonnenreich et al. | ....... | 709/204 |
| 6,064,856 A * | 5/2000 | Lee et al. | .................... | 434/350 |
| 6,130,668 A * | 10/2000 | Stein | ......................... | 715/210 |
| 6,180,862 B1* | 1/2001 | Hirano | ......................... | 84/601 |
| 6,211,451 B1* | 4/2001 | Tohgi et al. | ................ | 84/470 R |
| 6,288,753 B1* | 9/2001 | DeNicola et al. | ............ | 348/586 |
| 6,302,698 B1* | 10/2001 | Ziv-El | ......................... | 434/323 |
| 6,356,943 B2* | 3/2002 | Murray et al. | ............... | 709/220 |
| 6,369,310 B1* | 4/2002 | Brunson et al. | .............. | 84/600 |
| 6,411,796 B1* | 6/2002 | Remschel | ................... | 434/350 |
| 6,453,078 B2* | 9/2002 | Bubie et al. | ................. | 382/305 |
| 6,733,295 B2* | 5/2004 | Stuppy et al. | ............... | 434/322 |
| RE38,554 E * | 7/2004 | Ide | .............................. | 84/622 |
| 6,760,748 B1* | 7/2004 | Hakim | ........................ | 709/204 |
| 6,784,355 B2* | 8/2004 | Gyoten et al. | ................. | 84/622 |
| 6,885,844 B2* | 4/2005 | Roschelle et al. | ........... | 434/350 |
| 7,157,638 B1* | 1/2007 | Sitrick | ....................... | 84/477 R |
| 7,189,911 B2* | 3/2007 | Isozaki | ........................ | 84/609 |
| 7,279,628 B2* | 10/2007 | Miyamoto et al. | ............ | 84/615 |
| 7,297,856 B2* | 11/2007 | Sitrick | ....................... | 84/477 R |
| RE39,942 E * | 12/2007 | Fai et al. | ..................... | 434/350 |
| 7,456,352 B1* | 11/2008 | Hasegawa et al. | ............. | 84/600 |
| 2002/0004191 A1* | 1/2002 | Tice et al. | .................... | 434/350 |
| 2002/0014147 A1* | 2/2002 | Motoyama | ................... | 84/615 |
| 2003/0000368 A1* | 1/2003 | Isozaki | ........................ | 84/609 |
| 2003/0014486 A1* | 1/2003 | May | .......................... | 709/204 |
| 2004/0115600 A1* | 6/2004 | Wasowicz et al. | ........... | 434/169 |
| 2004/0161728 A1* | 8/2004 | Benevento et al. | .......... | 434/118 |
| 2004/0210753 A1* | 10/2004 | Goshima et al. | ............. | 713/100 |
| 2005/0003330 A1* | 1/2005 | Asgarinejad et al. | .......... | 434/20 |
| 2006/0154227 A1* | 7/2006 | Rossi et al. | .................. | 434/350 |
| 2007/0099163 A1* | 5/2007 | Tseng | ........................ | 434/350 |
| 2007/0226293 A1* | 9/2007 | Sakurada et al. | ............. | 709/203 |
| 2007/0238085 A1* | 10/2007 | Colvin et al. | ................ | 434/365 |
| 2008/0028916 A1* | 2/2008 | Shimizu | ................... | 84/477 R |

FOREIGN PATENT DOCUMENTS

| | | | |
|---|---|---|---|
| JP | 33714503 B2 | | 8/1995 |
| JP | 2004265314 A | * | 9/2004 |

OTHER PUBLICATIONS

ClassAct Computer based classroom management, viewed Dec. 30, 2008, created Mar. 3, 2008, at www.ljcreate.com.*

PowerGrade for Mac, seating chart, © 1999-2004 Apple Computer. Shows using photos associated to seating chart.*

First Class, Managing the class roster, classroom management software, viewed Jan. 2, 2008.*

TI-Navigator classroom management, seating chart © 2006 Texas Instrument Inc.*

Guide to Clarity's Results Manager, teaches dragging and dropping icons in Groups and Students, created Jun. 23, 2004.*

Machine Translation of JP2004-265314 A, rendered Jan. 1, 2009, based on document published Sep. 24, 2004.*

* cited by examiner

FIG. 1

| SLAVE INSTRUMENT NO. | STUDENT NAME | GROUP INFO. | | ATTENDANCE | OTHERS |
|---|---|---|---|---|---|
| 1 | A | G1 | (RED) | PRESENT | |
| 2 | B | | (GRAY) | ABSENT | |
| 3 | C | G1 | (RED) | PRESENT | |
| 4 | D | G1 | (RED) | PRESENT | |
| 5 | E | G1 | (RED) | PRESENT | |
| 6 | F | G2 | (YELLOW) | PRESENT | |
| 7 | G | | (GRAY) | ABSENT | |
| 8 | H | G2 | (YELLOW) | PRESENT | |
| 9 | I | G2 | (YELLOW) | PRESENT | |
| 10 | J | | (GRAY) | ABSENT | |
| 11 | K | | (GRAY) | ABSENT | |
| 12 | L | G2 | (YELLOW) | PRESENT | |
| 13 | M | G3 | (BLUE) | PRESENT | |
| 14 | N | | (GRAY) | ABSENT | |
| 15 | O | | (GRAY) | ABSENT | |
| 16 | P | G3 | (BLUE) | PRESENT | |

TRAINING SETTING APPARATUS AND SYSTEM, AND GROUPING METHOD THEREOF AND COMPUTER-READABLE MEDIUM CONTAINING COMPUTER PROGRAM THEREFOR

BACKGROUND

Among various forms of music performance training for electronic musical instruments known today is one where trainees or students attend a music class led by a trainer or instructor (or teacher) and actually play electronic musical instruments, provided in advance in the classroom, in front of the instructor so that they can directly receive training from the instructor. In such a form of music performance training, electronic musical instruments to be used by many students for performance practice (hereinafter referred to as "slave instruments") are connected, via a communication network, such as a LAN, to a single instructor's electronic musical instrument (hereinafter referred to as "master instrument") so that the instructor can simultaneously provide music performance training to the many students or users. At the time of music performance training, results of performance practice based on a predetermined performance practice course are transmitted, as necessary, from the slave instruments to the master instrument in response to performance operation, by the users, so that the performances executed on the slave instruments can be monitored by the instructor via the master instrument. On the other hand, training instructions, such as those related to performance techniques like fingering and performance accent and musical instructions (advice), are transmitted, as necessary, from the master instrument to the slave instruments, so that the students can receive the training instructions via the slave instruments. One example of such music performance training is disclosed in Japanese Patent Publication No. 3,371,503.

The conventionally-known music performance training apparatus, such as the one disclosed in the No. 3,371,503 publication, includes student switches for designating a particular student from among many students, group selection switches for grouping the many students, group switches for collectively designating a plurality of students belonging to any one of divided groups, etc. By operating any of these switches, the instructor can set the master instrument and slave instruments in such a manner that training instructions of the same contents can be given to a plurality of the students on a group-by-group basis, as well as on a student-by-student basis. However, in grouping many students, the instructor has to perform various switch operation, e.g., first operate the student switches to individually specify students to be grouped and then operate the group selection switches to group the specified students into groups. Such switch operation tends to be extremely cumbersome to the instructor and would take a lot of time and labor particularly when many students are grouped into several groups. Further, with the conventionally-known music performance training apparatus, the instructor cannot visually grasp or identify, at a glance, correspondency between the students (slave instruments) actually present in the classroom and the groups to which the grouped students belong. Thus, it has been difficult for the instructor to give group-by-group music performance training while identifying the students actually playing the slave instruments.

SUMMARY OF THE INVENTION

The present invention relates to training setting apparatus and system, and a grouping method thereof and a computer-readable medium storing a computer program therefor, that can group slave instruments, each of which can be equipped with a performance operator unit, such as a keyboard.

One aspect of the present invention is a training setting apparatus for grouping a plurality of slave instruments each assignable to a user. The training setting apparatus can include a display device, a connection section that connects to the slave instruments, a storage section that stores group information associated with the slave instruments, a display control section that displays, on the display device, a screen having an image representing at least each of the slave instruments connected to the connection section, an operation section that selects and moves at least one of the images representing the slave instruments displayed on the display device from an original positioned to a desired position, a determination section that determines a moved position of the selected image, an updating section that changes the group information stored in the storage section when the determined moved position corresponds to a position of another of the images representing the slave instruments, and a control section that returns the moved image from the moved position to the original position.

The group information can include a group identification assigned to each of the connected slave instruments. The updating section changes the group identification assigned to the slave instrument corresponding to the moved image to the group identification assigned to the slave instrument corresponding to the another image.

The slave instruments can be located in a classroom. In this instance, the display control section can display, on the display device, the screen of the classroom with the image representing all of the slave instruments in an actual positional relationship between the slave instruments in the classroom. All the slave instruments can be located in the same classroom, or some of the slave instruments can be in a classroom, while some of the slave instruments can be located outside the classroom. Alternatively, some or all of the slave instruments can be located at different locations and connectable to the master instrument via the Internet, and the screen with the images representing all of the slave instruments can be displayed as a classroom.

The operation section can assign a group identification to each of the slave instruments. At least two of the slave instruments can be assigned to have the same group identification.

The display control section can further display the group information of each of the slave instruments displayed on the display device. The displayed group information includes the group identification along with the corresponding image of each of the slave instruments. The displayed group information corresponding to of each of the slave instruments can include a drawing pattern specific to the group to which the slave instrument is assigned.

The operation section can include a mouse operator. Any one of the images representing the slave instruments can be selected in response to a click operation of the mouse operator, and the selected image is movable to a desired position in response to drag and drop operation of the mouse operator.

When the moved position determined by the determination section is in a region outside a predetermined frame set on a screen of the display device, the updating section can change the group information, stored in the storage section, of the slave instrument corresponding to the moved image to the group information indicative of an unassigned group.

The connection section can detect whether any of the connected slave instruments is turned on. The slave instruments each can be an electronic music instrument.

Another aspect of the present invention is a training setting system comprising a master instrument and the slave instruments. The master instrument can be the training setting apparatus described above.

Another aspect of the present invention is a method of grouping the slave instruments comprising the steps of providing the master instrument, connecting the master instrument to the slave instruments via a communication network and checking whether each of the connected slave instruments is turned on, storing the group information in the storage section, displaying, on the display device, the screen having an image representing at least each of the slave instruments that is turned on, selecting and moving at least one of the images representing the slave instruments displayed on the display device from the original position to the desired position, determining the moved position of the moved image, changing the group information when the determined moved position corresponds to a position of another of the images representing the slave instruments, and returning the moved image from the moved position to the original position.

The changing step changes the group identification assigned to the slave instrument corresponding to the moved image to the group information assigned to the slave instrument corresponding to the another image.

Another aspect of the present invention is a computer-readable medium containing a computer program for the master instrument for grouping the slave instruments. The computer program can include instructions for, connecting the master instrument to the slave instruments via the communication network and checking whether any of the connected slave instruments is turned on, storing the group information in the storage section, displaying, on the display device, the screen having an image representative of at least each of the slave instruments that is turned on, selecting and moving at least one of the images of the slave instruments displayed on the display device from the original position to the desired position, determining the moved position of the moved image, changing the group information when the determined moved position corresponds to a position of another of the images representing the slave instruments, and returning the moved image from the moved position to the original position.

The changing instruction changes the group identification assigned to the slave instrument corresponding to the moved image to the group identification assigned to the slave instrument corresponding to the another image.

DETAILED DESCRIPTION

Figure 1:
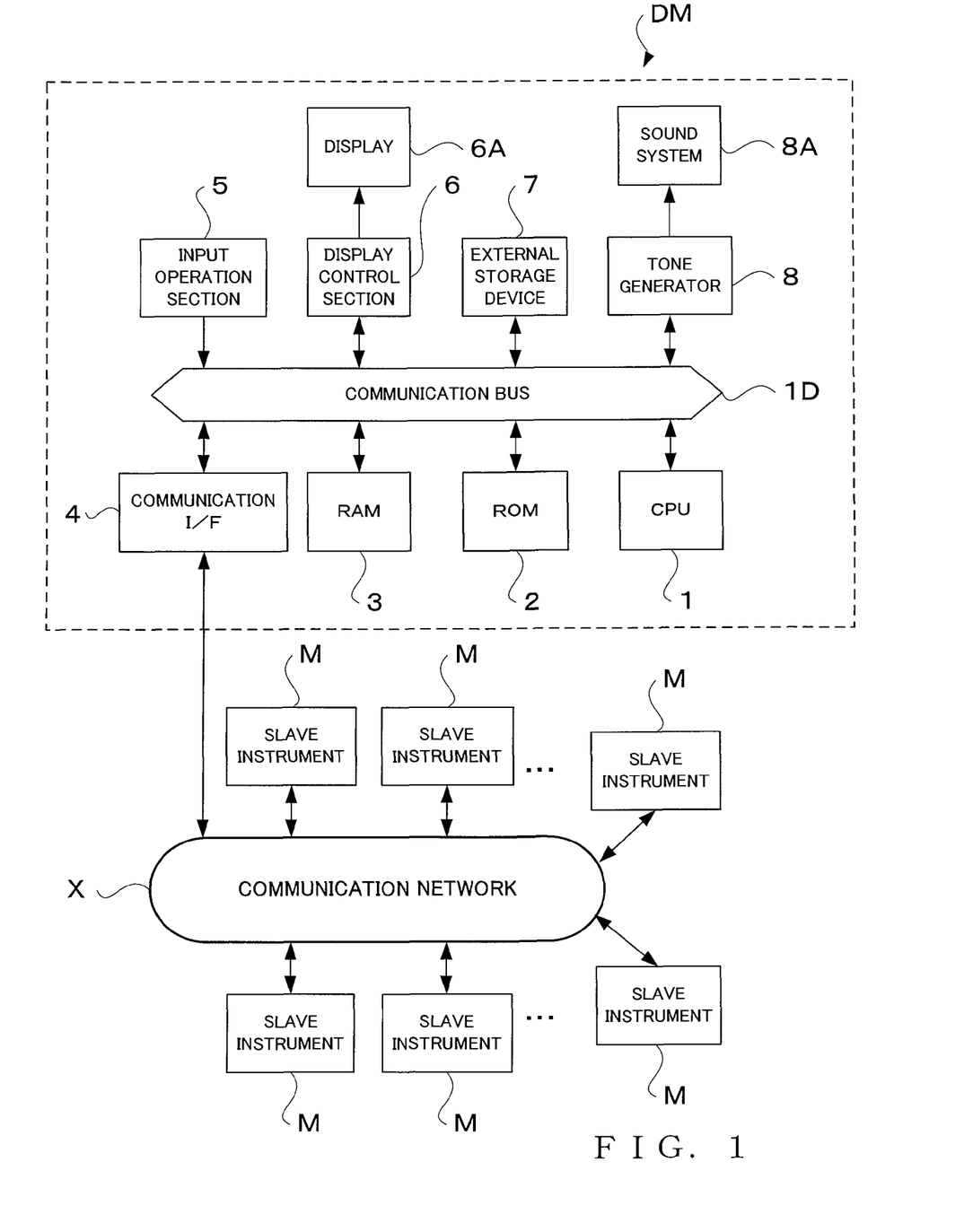
FIG. 1 is a block diagram illustrating a music-performance training setting system and an apparatus thereof.

FIG. 1 is a block diagram illustrating one embodiment of a music-performance training setting apparatus and a system according to the present invention. In the embodiment of FIG. 1, the music-performance training setting apparatus DM is illustrated as an electronic music. The apparatus DM is controlled by a microcomputer comprising a microprocessor unit (CPU) 1, a read-only memory (ROM) 2, and a random-access memory (RAM) 3. The CPU 1 controls behavior of the entire electronic music apparatus. To the CPU 1 are connected, via a communication bus (e.g., data and address bus) 1D, the ROM 2, RAM 3, a communication interface (I/F) 4, an input operation section 5, a display control section 6, an external storage device 7, and a tone generator 8. The ROM 2 stores therein various programs to be executed by the CPU 1 and various data to be referred to by the CPU 1. The RAM 3 is used as a working memory for temporarily storing various data generated as the CPU 1 executes a predetermined control program, as a memory for storing the currently-executed control program and data related thereto, and for various other purposes. Predetermined address regions of the RAM 3 can be 4 allocated and used as registers, flags, tables, memories, etc.

The communication interface (I/F) 4 is connected to a wired or wireless communication network, such as a LAN, the Internet, telephone line network, or the like. Via the communication network, the apparatus (hereafter "master instrument") DM to be operated (played) by an instructor (teacher) and one or more electronic musical instruments (hereafter "slave instruments") M to be operated (played) by users, such as trainees or students, are connected with each other for mutual communication therebetween. Thus, the communication interface 4 allows various information, such as setting information and tone information generated on the basis of setting operation and performance operation on the individual instruments, to be communicated between the master instrument DM and the slave instruments M. It should be appreciated that the communication interface 4 can be of either or both of wired and wireless types. Thus, a music performance training system is constructed of the master instrument DM and slave instruments M connected via the communication network.

The input operation section 5 can include operators, such as a performance operator unit or a keyboard equipped with a plurality of keys for selecting pitches of tones to be generated, selection switches for selecting a music piece and part thereof to be performed in performance training, and grouping switches for grouping the slave instruments M, connected to the master instrument DM, into one or more user-desired groups. The above-mentioned performance operator unit, such as a keyboard, can be used, not only for the tone performance but also as an input means for selecting a music piece and part thereof to be performed in performance training. The input operation section 5 can of course include various other operators, such as a numerical-value-data inputting key pad, a character (or letter)-data inputting keyboard, and a pointing device (e.g., mouse) for manipulating a predetermined pointer displayed on a display 6A, such as a crystal liquid display (LCD) panel or CRT. Under the control of the CPU 1, the display control section 6 displays, on the display 6A, various information and images, including not only a "classroom screen" via which many users (corresponding to the slave instruments), simultaneously receiving music performance training, can be grouped in response to operation, by the instructor, of simple icons on the screen (the "classroom screen" will be later described with reference to FIG. 2), but also a listing of music pieces capable of being used as objects of music performance training, part to be allocated to the slave instruments, musical scores of a music piece and part thereof selected as objects of music-performance training, settings (i.e., setting states) of the master instrument or slave instruments, or both, controlling states of the CPU 1, etc. As necessary, the instructor can, not only cause any of the above-mentioned information to be displayed on the display 6A, but also make settings, such as settings pertaining to grouping of the slave instruments, selection of a music piece and part thereof for music performance training, performance function of the electronic musical instruments, etc. These settings made by the master instrument DM can be reflected in the one or more slave instruments M connected to the master instrument DM via the communication network X.

The external storage device 7 is provided for storing various control programs to be executed by the CPU 1 and various data, such as "grouping processing" (to be later described with reference to FIG. 3) and performance data related to a music piece selected for music performance training. When a particular control program is not pre-stored in the ROM 2, the control program can be pre-stored in the external storage device (e.g., hard disk device) 7, so that, by reading the control program from the external storage device 7 into the RAM 3, the CPU 1 is allowed to operate in exactly the same way as in the case where the particular control program is pre-stored in the program memory 2. This arrangement can greatly facilitate version upgrade of the control program, addition of a new control program, etc. The external storage device 7 can comprise any of various removable-type media other than the hard disk (HD), such as a flexible disk (FD), compact disk (CD), magneto-optical disk (MO), and digital versatile disk (DVD), or a semiconductor memory.

The tone generator 8, which is capable of simultaneously generating tone signals in a plurality of channels, receives, via the communication bus 1D, performance data, various performance information generated in response to user's manipulation on the performance operator unit, etc. The tone generator 8 generates tone signals on the basis of the received performance data and information. The tone signals thus generated by the tone generator 8 are audibly reproduced or sounded by a sound system 8A including an amplifier and speaker. The tone signals thus generated by the tone generator 8 can be imparted with desired effects via an effect circuit (not shown). The performance data can be either of a digitally-encoded format, such as the MIDI format, or of a waveform sample data format, such as the PCM, DPCM, or ADPCM. The tone generator 8 and sound system 8A can be constructed in any desired conventional manner. The tone generator 8 can employ any desired tone synthesis method, such as the FM, PCM, physical model or formant synthesis method. Further, the tone generator 8 can be implemented by either dedicated hardware or software processing performed by the CPU 1.

Further, in the aforementioned electronic musical instruments (master instrument DM and slave instruments M), the performance operator unit can be of any type other than the keyboard instrument type, such as a stringed, wind, or percussion instrument type. Further, the electronic musical instruments (master instrument DM and slave instruments M) are not limited to the type where all of the input operation section 5, display 6A, tone generator 8, etc. are incorporated together within the body of the musical instrument, as they can be of another type where the above-mentioned input operation section 5, display 6A, tone generator 8, etc., are provided separately and interconnected via MIDI interfaces, communication interfaces of various communication networks or the like. Further, the master instrument is not limited to a form of an electronic musical instrument, as it can be any apparatus or equipment, such as a personal computer, portable communication terminal like a portable phone, karaoke apparatus, or game apparatus, as long as it can communicate with one or more slave instruments.

Figure 2:
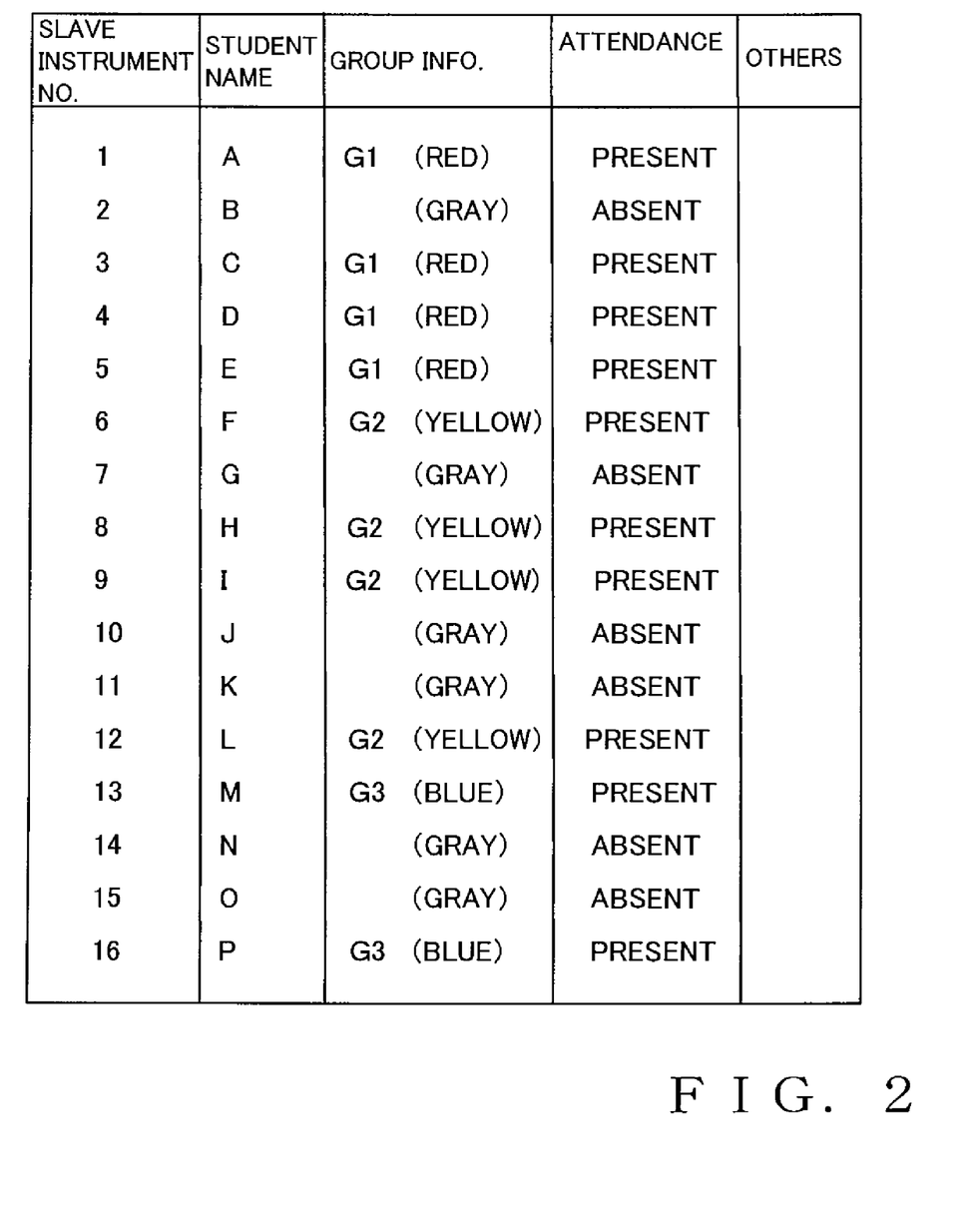
FIG. 2 is a diagram showing an example data format of slave instrument information.

The following describes the "slave instrument information," which is pre-stored in the external storage device 7 or the like, and referred to in order to display, as text information, predetermined information, associated with the individual slave instruments. These predetermined information, associated with the individual slave instruments, is displayed, on the later-described "classroom screen" (FIG. 4), together with predetermined musical instrument images (e.g., previously-prepared icons or thumbnails) symbolically representing the individual slave instruments actually placed within the classroom or elsewhere. FIG. 2 is a diagram showing an example data format of the slave instrument information.

The slave instrument information is recorded information corresponding to the musical instrument images on the "classroom screen" displayed on the display 6A (i.e., corresponding to the electronic musical instruments for users actually placed in the classroom). As illustratively shown in FIG. 2, the slave instrument information includes information indicative of slave instrument numbers and user names, group information, attendance information, and other information. The slave instrument numbers are unique numbers assigned in advance to the electronic musical instruments for users (slave instruments M), actually placed in the classroom, in association with the respective actual positions, in the classroom, of the instruments. In the illustrated example, 16 (sixteen) slave instruments M are actually placed in the classroom, and unique slave instrument numbers "1"-"16" are assigned to the 16 slave instruments M. The user names are the names of the individual users who receive music performance training using the respective slave instruments M actually placed in the classroom. The user names ("A"-"P" in the illustrated example) can be entered by the instructor, for example, before starting first music performance training, using a predetermined "setting screen" (not shown) and individually for the slave instruments M allocated to the users, or can be entered by the individual users themselves, for example before the start of the music performance training, via the respective slave instruments M allocated to the users.

Many users, simultaneously receiving music performance training, can be divided into a plurality of groups, in accordance with contents of music performance training (e.g., training levels and training parts of the users). Basically, the grouping of the users is implemented by the instructor (teacher) operating the master instrument DM. Groups to which the individual users (trainees) should belong are determined in accordance with the grouping. The group information is information indicative of the groups to which the individual users (trainees) belong. Many users who have been enrolled in music performance training and who are actually present in the performance training can be grouped into a plurality of groups in accordance with the group information. Thus, the instructor is allowed to give music performance training of the same contents to the users simultaneously (collectively) on the group-by-group basis, or on a user-by-user basis. When teaching materials, such as images and data, are to be transmitted, via the communication network X, to the slave instruments M, images and data of same contents can be readily transmitted to the slave instruments of the same group. According to the illustrated example, of the 16 enrolled users, only those actually present in the training among are grouped into three groups G1-G3, namely, four users "A", "C", "D," and "E" included in the first group G1, four users "F", "H", "I," and "L" included in the second group G2, and two users "M" and "P" included in the third group G3. The users absent from the performance training (i.e., absentees) need not be grouped. The group numbers included in the group information are associated with predetermined colors, and each of the colors allocated to the individual group numbers is used to color-display slave instrument icons HC, symbolically representative of the respective slave instruments, on the "classroom screen". Predetermined colors can be allocated in advance to the individual group numbers, or the user can designate desired colors to be allocated to the individual group numbers. A "gray" color can be allocated uniformly to all of the absentees not grouped (see attendance information described below).

The attendance information can be information indicative of attendance (presence/absence) of the individual users in one music performance training session. In the illustrated example, each user present in the music performance training session is indicated as "present," while each user absent from the music performance training session is indicated as "absent." More specifically, once a user powers on the electronic musical instrument (slave instrument M) allocated to the user in advance, the user is automatically registered as "present" and once a user powers off the electronic musical instrument (slave instrument M) allocated thereto, the user is automatically registered as "absent." Namely, even if a given user is actually present in the performance training session, the given user is treated as being "absent" unless he or she powers on the electronic musical instrument allocated thereto.

The above configuration can be set differently, and of course should not be so limited. The instructor can visually check attendance of the individual users and use the master instrument DM to enter presence/absence of the individual users corresponding to the slave instruments M. In another alternative, the user using the allocated slave instrument M can be registered as "present," for example, when the user has performed some operation for the first time using the allocated slave instrument M after powering on the instrument M or when the user himself or herself has entered "present." The aforementioned other information in the slave instrument information can include, for example, information related to a test music piece and part thereof selected for the performance training, setting information (e.g., setting information of tone colors and effects) related to performance tones of the individual electronic musical instruments, information indicative of the classroom number (e.g., training system ID), etc.

Figure 3:
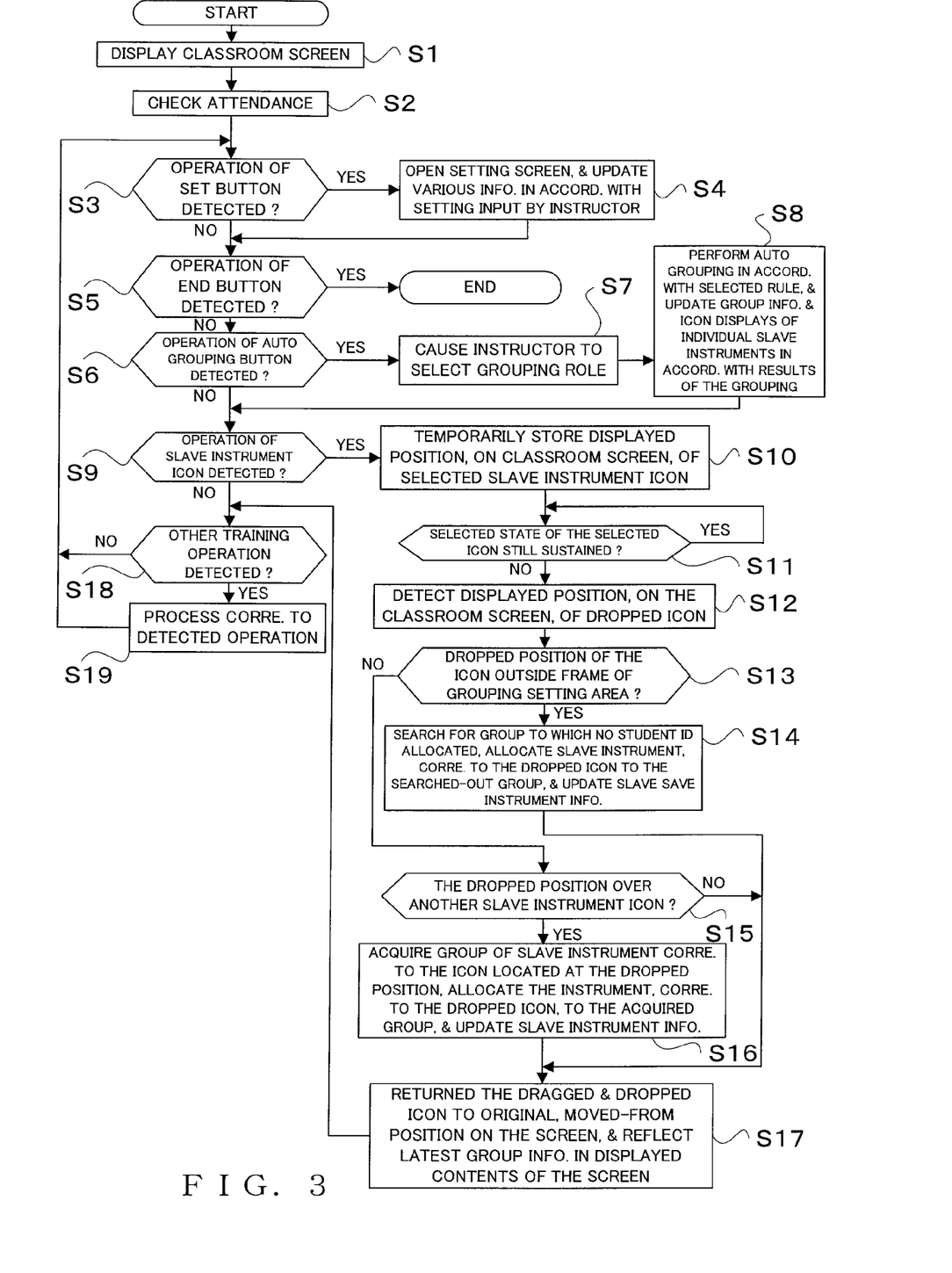
FIG. 3 is a flow chart showing an example operational sequence of grouping processing performed in the embodiment of FIG. 1.

Now, with reference to FIG. 3, a description will be given regarding the "grouping processing" for displaying the "classroom screen" of FIG. 4 on the display 6A and then grouping the users in response to operation, by the user, on the "classroom screen." FIG. 3 is a flow chart showing an example operational sequence of the "grouping processing." The "grouping processing", which is performed on the instructor's electronic musical instrument (master instrument) DM, is started in response to operation of the grouping switches by the instructor. A series of selecting and moving operations can be made one after another in the grouping processing.

At step S1, an operation is performed for displaying the "classroom screen" on the display 6A. As will be later described in detail in relation to FIG. 4, the "classroom screen" displayed on the display 6A is a GUI (Graphical User Interface) screen, on which predetermined electronic musical instrument images (i.e., symbolic images, such as master instrument icon HO and slave instrument icons HC symboli- cally representative of the electronic musical instruments for the instructor and users) are displayed in predetermined positional relationship, corresponding to actual positional relationship, in the classroom, of the electronic musical instruments (master and slave instruments) DM and M, as well as images of predetermined operation buttons displayed beneath the electronic musical instrument images. The control section 6 and the display 6 can display "classroom screen" with the symbolic images, such as the master instrument icon HO and slave instrument icons HC, prepared in advance by the user, and in accordance with display layout information. Scheme for displaying such a screen is already known per se in the art and will not be described in detail here. At step S2, attendance (presence/absence) of each user is checked based on the status of the electronic musical instruments for users (slave instruments) M actually placed in the classroom.

In checking the presence/absence of each of the users, turning-on/off, for example by the user, of the power switch of the slave instrument M allocated to the user can be automatically detected by the master instrument DM. For instance, the communication interface (I/F) 4 can be used to detect the power on/off status of each slave instrument M. Specifically, if the power is off in the slave instrument M, it will not be able to communicate with the master instrument DM, which can indicate the user being absent. The user is treated as "present" if the automatic detection indicates that the allocated slave instrument M is in the power-ON state, while the user is treated as "absent" if the automatic detection indicates that the allocated slave instrument M is in the power-OFF state. At that time, respective ID information of the attending users, based on the slave instruments M status can be acquired, as the attendance information, in association with the numbers of the individual slave instruments M. Then, the attendance information in the slave instrument information (see FIG. 2) is updated, on the basis of which the display color of the electronic musical instrument image (slave instrument icon HC) of each absent user, displayed on the "classroom screen", is changed to the predetermined color (in this example, "gray" color).

At step S3, a determination is made as to whether or not selective operation of a "SET" button B2 on the "classroom screen" has been detected. Possible forms of the selective operation, by the user (instructor), of the "SET" button B2, include one where the pointer P is clicked after having been caused to overlap or hover the "SET" button B2 on the "classroom screen." If such selective operation of the "SET" button B2 has been detected (YES determination at step S3), the "setting screen" (not shown) is displayed, for example as a popup screen, over the currently-displayed "classroom screen," and the "other information" in the slave instrument information (see FIG. 2) is updated, at step S4, in accordance with a test music piece and part thereof selected as objects of performance training, setting information (e.g., setting information of tone colors and effects) relating to the performance tones of the individual electronic musical instruments etc., entered by the user (instructor) using the "setting screen." At that time, the user can cause the display 6A to promptly return to the "classroom screen" at any time, by performing operation for closing the currently-displayed "setting screen."

At next step S5, a determination is made as to whether selective operation (e.g., clicking operation) of an "END" button B3 on the "classroom screen" (FIG. 4) has been detected. If such selective operation of the "END" button B3 has been detected (YES determination at step S5), the instant "grouping processing" is brought to an end. At next step 6, a determination is made as to whether selective operation (e.g., clicking operation) of an "AUTO GROUPING" button B1 on the "classroom screen" (FIG. 4) has been detected. If such selective operation of the "AUTO GROUPING" button B1 has been detected (YES determination at step S6), a "selection screen" is displayed on the display 6A of the master instrument DM for allowing the instructor to select a grouping rule as will be later described (step S7). Such a "selection screen" for selecting a grouping rule can be displayed, for example as a popup screen, over the currently-displayed "classroom screen." Then, the users are automatically grouped in accordance with the grouping rule selected on the "selection screen," and then, in accordance with results of the automatic grouping, the "group information" in the slave instrument information (see FIG. 2) and the display of the individual slave instrument icons HC are updated (step S8). Such updating of the individual slave instrument icons HC on the "classroom screen" includes, not only by changing the display colors of the electronic musical instrument images (slave instrument icons HC), corresponding to the automatically-grouped users, on the "classroom screen" to colors corresponding to the groups (i.e., in such a manner that the slave instrument icons HC corresponding to the users of the same group are displayed in the same color), but also displaying the names of the groups (G1, G2, ... shown in FIG. 4), to which the individual users currently belong, within the respective slave instrument icons HC (or near the respective slave instrument icons HC) in addition to the slave instrument numbers (slave instrument 1, slave instrument 2, ... shown in FIG. 4) and names of the users (A, B, ... shown in FIG. 4) already displayed as text information.

The above-mentioned grouping rule is a rule for defining how many users (two, four, or eight) should make up each group. By selecting a desired grouping rule per performance training session, the instructor can cause many users, present in the training session, to be automatically grouped into groups in accordance with the selected grouping rule, i.e., on the basis of the predetermined number of users, such as two, four, or eight users. For example, if the instructor has selected the grouping rule that each group should be made up of "four" users, then only the slave instruments to be used by the users, treated as "present" in accordance with the slave instrument information shown in FIG. 2, are automatically grouped in the order of the unique slave instrument numbers (with the slave instruments of the absent users skipped) and in accordance with the selected automatic grouping rule (in this case, "four-user-each" rule). However, if four users have not been included in the last group, to which the last-grouped user belongs, one or more users less than four are grouped, by way of exception, as the group, and then the grouping processing is brought to an end.

At step S9, a determination is made as to whether selective operation of any one of the slave instrument icons HC on the "classroom screen" (FIG. 4) has been detected. Possible forms of the selective operation of any one of the slave instrument icons HC on the "classroom screen" can include one where the pointer P is clicked after having been positioned over the desired slave instrument icon HC on the screen (i.e., click operation). Note that a plurality of slave instrument icons HC, rather than just one slave instrument icon HC, can be selectively operated collectively. If such selective operation of any of the slave instrument icons HC has been detected (YES determination at step S9), a displayed position (moved-from position or clicked position), on the "classroom screen," of the selected slave instrument icon HC at the time point of the selection of the slave instrument icon HC is temporarily stored at step S10. At step S11, a determination is made as to whether the selected state of the same selected slave instrument icon HC is still sustained. If a YES determination has been made at step S11, e.g., if the same selected slave instrument icon HC is still kept clicked through user's operation of the mouse, the operation of step S11 is repeated to temporarily place the instant processing in a standby state. In that state, the user (i.e., human operator of the master instrument DM) moves or drags the selected slave instrument icon HC to a desired position on the "classroom screen," upon which the user performs predetermined operation, such as canceling the clicking by the mouse, i.e., drop operation, for specifying that the desired position is an end of the movement or drag. If the selected state of the same selected slave instrument icon HC is no longer sustained (for example, due to user's operation for canceling the mouse-clicked state of the slave instrument icon HC) as determined at step S11, a NO determination is made at step S11, which means that the user has performed predetermined operation, such as drop operation, of the selected slave instrument icon HC for specifying that the desired position is the end of the movement or drag. In such a case, the processing moves to step S12 in order to detect a displayed position (moved-to position or dropped position), on the "classroom screen," of the selected slave instrument icon HC at the time of the cancellation of the selected state (i.e., at the time of the drop operation).

Figure 4:
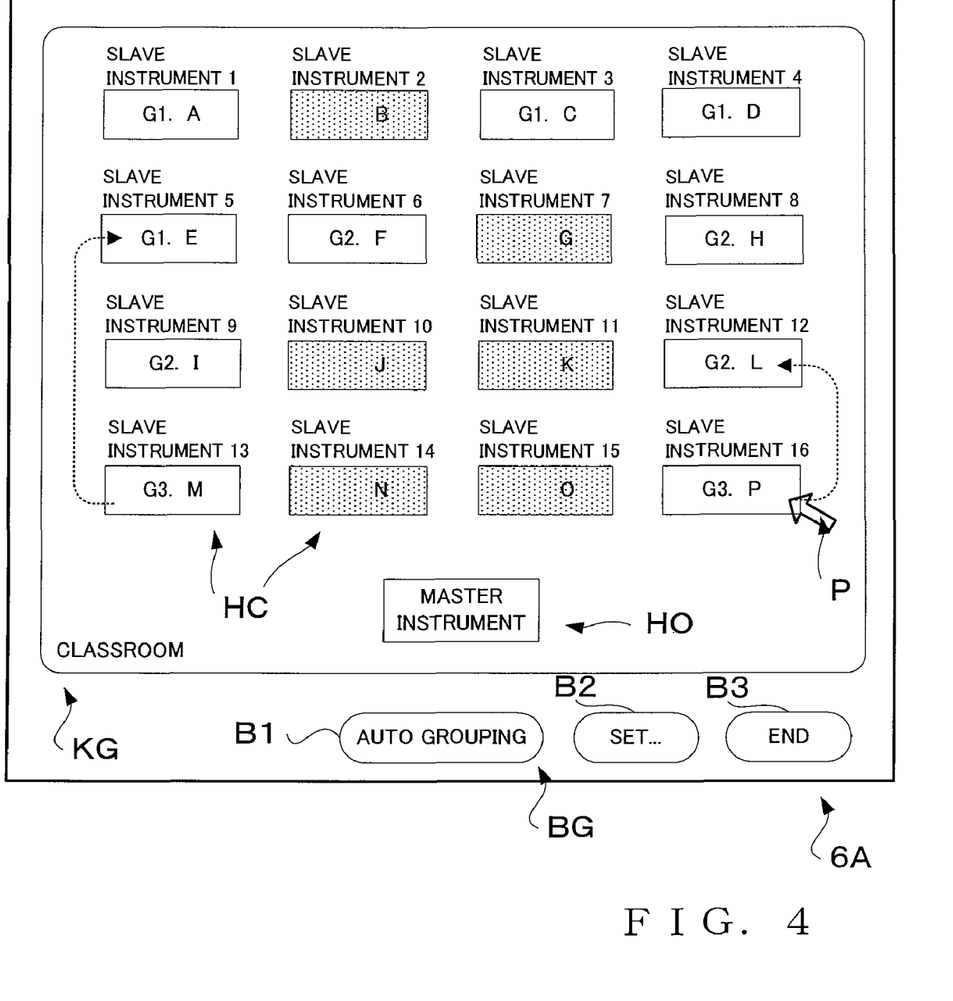
FIG. 4 is a conceptual diagram showing an example of a classroom screen employed in the embodiment of FIG. 1.

At step S13, a determination is made as to whether the detected moved-to position of the selected slave instrument icon HC is outside the frame of the "classroom screen" (more specifically, outside the frame of a grouping setting area KG shown in FIG. 4). If the detected moved-to (or dropped) position of the selected slave instrument icon HC is outside the frame of the "classroom screen" (YES determination at step S13), a group setting is made, at step S14, such that only the user using the slave instrument corresponding to the selected slave instrument icon HC belongs to a new group alone. Namely, the group information in the slave instrument information, stored in the external storage device 7, is updated so that the user using the slave instrument corresponding to the selected slave instrument icon HC is excluded from the group to which that user belonged before the movement of the selected slave instrument icon HC and a new group is composed of the thus-excluded user alone. More specifically, a search is made, for example with reference to the slave instrument information (FIG. 2), for a group to which no user is allocated (belongs), and the excluded user is allocated to the thus searched-out group. As one example of the way of searching for a group to which no user is allocated (belongs), a search can be made through the slave instrument information shown in FIG. 2, and if the slave instruments are currently allocated to all of the existing groups, there can be created a group identifiable by a group number that has not yet been registered in the slave instrument information. After creating such a new group, settings can be made to allocate one or more other users to belong to the new group. After completion of the aforementioned operation of step S14, the processing jumps to step S17.

If the detected moved-to-position of the selected slave instrument icon HC is not outside the frame of the "classroom screen" (NO determination at step S13), a further determination is made, at step S15, as to whether the moved-to-position of the slave instrument icon HC is over another one of the slave instrument icons HC within the frame of the "classroom screen" (within the frame of the grouping setting area KG shown in FIG. 4). Namely, a determination is made, at step S15, as to whether the slave instrument icon HC moved by clicking operation has been dropped with at least part of it overlapping the other slave instrument icon HC. If the moved slave instrument icon HC has been dropped with at least part of it overlapping the other slave instrument icon HC (YES determination at step S15), the group information in the slave instrument information stored in the external storage device 7 is referenced to acquire the group information of the slave instrument corresponding to the other slave instrument icon HC located at the moved-to position of the moved slave instrument icon HC, then the same group as indicated by the acquired group information is determined as a group to which the slave instrument corresponding to the dragged and dropped slave instrument icon HC should belong, and then the group information in the slave instrument information stored in the external storage device 7 is updated (step S16).

At step S17, the updated or latest slave instrument information is referenced, and then, not only the dragged and dropped slave instrument icon HC is returned from the moved-to position to the original displayed position (moved-from position) on the "classroom screen" that was temporarily stored earlier at the time point of the selection of the slave instrument icon HC, but also group identifying characters corresponding to the updated group information are displayed. Namely, according to the grouping processing in the instant embodiment, the displayed position, on the "classroom screen," of each of the slave instrument icons HC is not changed between before and after drag and drop operation of a user-desired slave instrument icon HC, and only the group identifying characters (indicative of group names) displayed on the "classroom screen" are changed between before and after drag and drop operation of a user-desired slave instrument icon HC. At next step S18, a further determination is made as to whether other training operation using the "classroom screen" of FIG. 4 has been detected. Examples of such other training operation include training instructions, such as those related to performance techniques like fingering and performance accent and musical instructions (advice). If other training operation has been detected (YES determination at step S18), a process corresponding to the detected operation is performed at step S19. After completion of step S19, the processing reverts to step S3 in order to repeat the aforementioned operations from steps S3 to S19.

Next, with reference to FIG. 4, a description will be given regarding the "classroom screen" that is used by the instructor for grouping many users, simultaneously receiving music performance training, in accordance with the levels of the users, parts of a music piece selected as an object of performance training, etc. FIG. 4 is a conceptual diagram showing an example of the "classroom screen."

The "classroom screen" shown in FIG. 4 is a GUI (Graphical User Interface) screen displayed in accordance with a size of a display window displayable in variable size. The "classroom screen" uses many graphics in displaying information to the user and allows most of user-grouping-related operation to be performed by operation of the pointing device, such as the mouse. The instant example of the "classroom screen" generally comprises the grouping setting area KG to be used for grouping the users in response to operation by the user, and a button setting area BG for displaying various operation buttons. In the grouping setting area KG, the master instrument icon HO corresponding to the instructor's electronic musical instrument (master instrument) DM and slave instrument icons HC corresponding to the electronic musical instruments for users (slave instruments) M are displayed in respective predetermined display positions on the screen corresponding to the actual positional relationship among the electronic musical instruments actually placed in the classroom. The illustrated example of FIG. 4 represents the classroom where the slave instruments are actually placed in four vertical rows and four horizontal rows (i.e., "4×4" arrangement) as viewed from the master instrument. Per slave instrument icon HC (namely, within or near each slave instrument icon HC), there are displayed the slave instrument number (slave instrument 1, slave instrument 2, . . . ) uniquely assigned to the slave instrument, the ID information or name of the user (user A, user B, . . . ) allocated to (i.e., supposed to use) the slave instrument, and group information indicative of a group to which the user belongs. In the illustrated example, the display of the group information comprises displaying a group-identifying character (letter, numeral and/or mark) indicative of the name of the group. Prior to execution of the operation for grouping the users, no group number need be displayed, assuming that none of the users currently belongs to any group; alternatively, a same predetermined group-identifying character (e.g., G1) can be displayed, assuming that all of the users currently belong to a same group. The bobbin setting area BG is an area where are displayed images of operation buttons, such as the "AUTO GROUPING" button B1, "SET" button B2 and "END" button B3.

As the slave instruments M are powered on by the users prior to the start of a music performance training session, the master instrument DM detects the powering-on of the individual slave instruments M and changes the displayed color, on the screen, of each of the slave instrument icons HC corresponding to the powered-on slave instruments M from the "gray" color, indicating that the user in question is absent, to one of predetermined colors allocated to individual groups of the users (attendance check or roll call). Namely, for each of the slave instrument icons HC, corresponding to the slave instruments of which the users are absent and which remain powered off (slave instrument 2, slave instrument 7, slave instrument 10, slave instrument 11, slave instrument 14 and slave instrument 15 in the illustrated example), the displayed color is left unchanged from the "gray" color. If, in such a situation, a grouping rule instructing that each group be composed of "four users" has been selected and the "AUTO GROUPING" button B1 has been operated, the users present in the performance training are sequentially grouped four by four (i.e., by fours), starting with "user A"; namely, four users "A, C, D and E" are grouped into the first group G1, four users "F, H, I and L" are grouped into the second group G2, and the remaining two users "M and P" less than four are automatically grouped into the third group G3. Then, in accordance with the automatic grouping, not only the displayed color of each of the slave instrument icons HC is changed to any one of the colors allocated to the groups, but also the group-identifying character is displayed for each of the slave instrument icons HC.

As a result of the aforementioned automatic grouping, the third group G3 has been composed of only two users, i.e. "user M" ("slave instrument 13") and "user P" ("slave instrument 16"). Thus, when all of the present users are to be grouped into two greater groups by, for example, putting (re-grouping) "user M" and "user P" into the first and second groups, respectively, the instructor drags and drops the slave instrument icon of "slave instrument 13" onto the slave instrument icon of "slave instrument 5" and also drags and drops the slave instrument icon of "slave instrument 16" onto the slave instrument icon of "slave instrument 12." More specifically, the slave instrument icon of "slave instrument 13" (or "slave instrument 16") is designated in response to instructor's click operation of the slave instrument icon, then the designated or clicked slave instrument icon of "slave instrument 13" (or "slave instrument 16") is moved to the displayed position of the slave instrument icon of "slave instrument 5" (or "slave instrument 12") in response to instructor's drag operation of the slave instrument icon, and then the slave instrument icon of "slave instrument 13" (or "slave instrument 16") is dropped, in response to instructor's drop operation, while being kept overlapping the slave instrument icon of "slave instrument 5" (or "slave instrument 12"). In this way, the user operating the slave instrument corresponding to the dragged and dropped slave instrument icon can be transferred to the group to which the user operating the slave instrument corresponding to the overlapped slave instrument icon belongs.

In the aforementioned case, "user M" of "slave instrument 13" is transferred to the first group to which "user E" using "slave instrument 5" belongs, and thus, the slave instrument icon of "slave instrument 13" is changed from the group display "G3," indicating that the user in question belongs to the third group, to the group display "G1" indicating that the user in question now belongs to the first group. On the other hand, "user P" of "slave instrument 16" is transferred to the second group to which "user L" using "slave instrument 12" belongs, and thus, the slave instrument icon of "slave instrument 16" is changed from the group display "G3," indicating that the user in question belongs to the third group, to the group display "G2" indicating that the user in question now belongs to the second group. It should be noted that the display of the dragged and dropped slave instrument icon is automatically returned from the dropped position (i.e., moved-to position) to the original, moved-from position where it was in before the movement. Namely, despite the drag and drop operation of the slave instrument icon HC, relationship among the displayed positions, on the "classroom screen," of the slave instrument icons HC is not changed at all between before and after the execution of the user grouping.

As set forth above, the instant embodiment is constructed to perform user grouping such that, in response to drag and drop operation of a slave instrument icon on the "classroom screen," the user using the slave instrument associated with the dragged slave instrument icon and the user using the slave instrument corresponding to the slave instrument icon overlapping by the dropped slave instrument icon belong to the same group. As a result, the user is allowed to perform, with utmost ease, grouping of many users intuitively on the screen.

Further, because the displayed position, on the "classroom screen," of the dragged and dropped slave instrument icon relative to the other slave instrument icons is left unchanged even when the user grouping has been implemented in response to the drag and drop operation of the slave instrument icon, the instant embodiment allows the user to readily visually identify, at any time, correspondency between the users (slave instruments) actually present in the classroom and the groups to which the grouped users belong on the screen.

The grouping aspect described above is responsive to drag and drop operation of a slave instrument icon on the "classroom screen" implemented in response to operation of the mouse. That operation, however, is not to be limited to that mode. The grouping can be implemented, for example, in response to movement of the pointer P using a display device equipped with a coordinate input function, such as a touch panel, or using a tablet, trackball, or the like.

Further, whereas, in the above-described embodiment, the slave instrument icons HC displayed on the "classroom screen" are each an icon where the group-identifying character and user name are indicated within a simple rectangular block, the icons are not to be limited to that presentation. For instance, the slave instrument icons HC can each be an icon of a desired drawing pattern. In such a case, the slave instrument icons can have drawing patterns that differ among (i.e., are specific to) the user groups, so that the group information can be displayed in the drawing patterns of the icons themselves.

Further, the "classroom screen" can be displayed in a plurality of pages, in which case the user grouping can be permitted either only in one page or over different pages of the "classroom screen." When the user grouping is permitted over different pages of the "classroom screen," a page switching button can be provided on the "classroom screen" so that switching can be made between the pages in response to drag and drop, onto the page switching button, of a slave instrument icon HC; further, in this case, the slave instrument icon HC selected on (dragged from) the previous page can be displayed on the switched-to page so that the user can again drag and drop the slave instrument icon HC.

Further, the slave instrument icons HC corresponding to absent users need not be uniformly displayed in "gray" color, and can be displayed in color differing among the groups. Further, the absent users can be treated as "not belonging to any group." Furthermore, displayed colors of the slave instrument icon HC, to be allocated on the group-by-group basis, can be changed as desired by the user on the not-shown "setting screen." Furthermore, whereas the embodiment has been described above in relation to the case where a user is excluded from a group in response to the corresponding slave instrument icon HC being dragged and dropped outside the frame of the "classroom screen," it should not be limited to such group cancellation operation. For example, dragging and dropping of the corresponding slave instrument icon HC onto a region of the "classroom screen" where no slave instrument icon HC is displayed can be recognized as the operation for excluding a user from a group. In such a case, each user having been excluded from a group can be made a "non-group-allocated user" instead of being allocated to a new group having no other user allocated thereto.

Furthermore, whereas the automatic grouping has been described as implemented in accordance with a grouping rule defining the number of users (two, four, eight or the like) that should make up each group, the automatic grouping can of course be performed in any other suitable manner. For example, the automatic grouping can be implemented in accordance with how far the users have performed an assignment given thereto by the instructor, skill of the individual users, positions (vertical and horizontal rows), in the classroom, of the electronic musical instruments, or the like.

Furthermore, whereas the above-described embodiment is constructed to check attendance (presence/absence) of the users, using the slave instruments, through automatic detection of signals generated in response to powering-on of the slave instruments, the instructor can visually check attendance of the individual users and perform setting operation manually on the basis of the visually-checked attendance.

Further, the drag and drop operation should not be limited to only one slave instrument icon HC at a time. For example, a plurality of slave instrument icons HC can be simultaneously selected, in response to range specifying operation via the mouse, and simultaneously dragged and dropped, so as to collectively group a plurality of users or cancel grouping of the users.

Furthermore, in the user grouping performed in the above-described embodiment, a selected slave instrument icon can be dragged and dropped to overlap another slave instrument icon belonging to a target (desired) group. Alternatively, there can be provided a tolerance range of a several-dot width around the outer periphery of each slave instrument icon HC so that a moved slave instrument icon can be regarded as having overlapped another slave instrument icon of a target group as long as the moved-to position is within the tolerance range, so that the user corresponding to the moved icon can be grouped into the same group as the user corresponding to the icon located at the moved-to position of the moved icon. Further, if a plurality of adjoining slave instrument icons HC belong to the same group, and desired grouping can be performed with a moved slave instrument icon HC regarded as having overlapped any one of the adjoining slave instrument icons HC as long as a moved-to position of the moved icon is in an area between the adjoining slave instrument icons HC, so that the user corresponding to the moved icon can be grouped into the same group as the user corresponding to the icon located at the moved-to position of the moved icon.

Further, whereas the above-described embodiment has been described to set (or change) a user group by mouse-clicking a slave instrument icon, corresponding to a user to be newly allocated to a group, and then dragging and dropping the mouse-clicked slave instrument icon onto another slave instrument icon of a desired group, it should not be limited thereto. Any other suitable methods can be employed. For example, as another embodiment of the present invention, icons or tags symbolically representative of individual groups can be displayed in advance on a desired area of the screen, and a slave instrument icon, corresponding to a user for whom a group is to be newly set or changed, is mouse-clicked and moved (dragged and dropped) to one of the icons or tags representative of a desired group.

Note that slave instruments M themselves need not include a musical instrument as they each can be a mere computer or electronic terminal. In such a case, the slave instruments M and the musical instruments used by the users for performance training can be mutually different hardware, and the slave instruments M function as information terminals that display teaching material data, such as a musical score sent from the instructor to the users or input messages to be delivered from the slave instruments M to the master instrument DM.

The present invention is not limited to music performance training, and can be applied to other types of training systems involving groups of users, including slave devices not all physically located in a classroom. That is, the slave devices and the master device can be all located at different locations, with the slave device connected to the master device via a network, such as the Internet.

According to the present disclosure, on the display device, a classroom screen can be displayed where symbolic images representing the respective slave instruments, connected to the master instrument can be displayed in accordance with actual positional relationship among the slave instruments in the classroom or based on their locations.

Manual operation for grouping the slave instrument can comprise a series of image operation of selecting and moving any one of the symbolic images displayed on the display device to a desired position. If the moved position corresponds to another symbolic image corresponding to another slave instrument, the group identification, which can be stored in a storage, of the slave instrument corresponding to the moved symbolic image to the group identification of the slave instrument corresponding to the another symbolic image. The display is automatically changed so that the moved symbolic image returns from the moved position to the original position. Thus, a master user (teacher, instructor, or administrator of a training system) can set the groupings of the users (users) with enhanced ease and efficiency. Further, because the moved symbolic image is returned to the original displayed position where it was before the movement and thus the displayed contents of the screen (where the symbolic images representative of the respective slave instruments are displayed in accordance with the actual positional relationship among the slave instruments) remain the same. Accordingly, by designating a desired one of the images on the displayed screen and merely performing intuitive operation of moving the designated image to overlap another image, the grouping can be changed with ease.

The present invention can be constructed and implemented, not only as the apparatus and system as discussed above, but also as a method. Also, the present invention can be implemented as a software program in a computer-readable medium. Further, a dedicated processor with dedicated logic built in hardware, not to mention a computer or other general-purpose type processor capable of running a desired software program, can be used to carry out the present invention.

While the present invention has been particularly shown and described with reference to preferred embodiment thereof, it will be understood by those skilled in the art that the foregoing and other changes in form and details can be made therein without departing from the spirit and scope of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

This application is based on, and claims priority to, JP PA 2006-209785 filed on 1 Aug. 2006. The disclosure of the priority application, in its entirety, including the drawings, claims, and the specification thereof, is incorporated herein by reference.

What is claimed is:

1. A training setting apparatus comprising:
a display device;
a communication interface device section configured to connect the training setting apparatus to a plurality of slave electronic musical instruments, each assignable to a music student;
a storage device section configured to store group information associated with the slave electronic musical instruments;
an input operation device section configured to receive input from a user of the training setting apparatus pertaining to the user's selecting of a grouping rule for grouping the slave electronic musical instruments;
a processing device section configured to automatically group the slave electronic musical instruments in accordance with the grouping rule selected by the user via said input operation device section, and update the group information associated with the slave electronic musical instruments, stored in said storage device section, in accordance with a result of the automatic grouping of the slave electronic musical instruments; and
a display control device section configured to display, on the display device, a screen having an image representing at least each of the slave electronic musical instruments connected to the communication interface device section,
wherein the processing device section is further configured to select and move at least one of the images representing the slave electronic musical instruments displayed on the display device from an original positioned to a desired position based upon input received from the user via the input operation device section,
wherein the processing device section is further configured to determine a moved position of the selected image,
wherein the processing device section is further configured to change the group information stored in the storage device section when the determined moved position corresponds to a position of another of the images representing the slave electronic musical instruments, wherein the processing device section is further configured to return the moved image from the moved position to the original position as displayed on the display device by interacting with the display control device section, wherein the group information includes a group identification assigned to each of the connected slave electronic musical instruments, wherein the processing device section is further configured to change the group identification assigned to the slave electronic musical instrument corresponding to the moved image to the group identification assigned to the slave electronic musical instrument corresponding to the another image, wherein the display device is connected to the display control device section, wherein the communication interface device section, the storage device section, and the input operation device section, are connected to the processing device section, wherein the display device, the display control device section, the communication interface device section, the storage device section, and the input operation device section all are implemented at least in part by electronic components, and wherein the training setting apparatus is a master electronic musical instrument with respect to the slave electronic musical instruments and is configured to be operated by a music instructor of the music students.

2. The training setting apparatus according to claim 1, wherein the slave electronic musical instruments are located in a classroom, and wherein the display control section is further configured to display, on the display device, a screen of the classroom with an image representing all of the slave electronic musical instruments in an actual positional relationship between the slave electronic musical instruments in the classroom.

3. The training setting apparatus according to claim 1, wherein the slave electronic musical instruments are located at different locations and connectable to the training setting apparatus via the Internet, and wherein the display control device section is further configured to display, on the display device, a screen with images representing all of the slave electronic musical instruments as a classroom.

4. The training setting apparatus according to claim 1, wherein the processing device section is further configured to assign a group identification to each of the slave electronic musical instruments.

5. The training setting apparatus according to claim 1, wherein the display control device section is further configured to display the group information of each of the slave electronic musical instruments displayed on the display device.

6. The training setting apparatus according to claim 5, wherein the displayed group information includes the group identification along with the corresponding image of each of the slave electronic musical instruments.

7. The training setting apparatus according to claim 5, wherein the displayed group information corresponding to each of the slave electronic musical instruments includes a drawing pattern specific to the group to which the slave electronic musical instrument is assigned.

8. The training setting apparatus according to claim 1, wherein the input operation device section includes a mouse operator, and wherein any one of the images representing the slave electronic musical instruments is selectable in response to a click operation of the mouse operator, and the selected image is movable to a desired position in response to drag and drop operation of the mouse operator.

9. The training setting apparatus according to claim 1, wherein, when the moved position determined by the processing device section is in a region outside a predetermined frame set on a screen of the display device, the processing device section is further configured to change the group information, stored in the storage section, of the slave instrument corresponding to the moved image to the group information indicative of an unassigned group.

10. The training setting apparatus according to claim 1, wherein the communication interface device section is further configured to detect whether any of the connected slave instruments is turned on.

* * * * *